Figure 5:
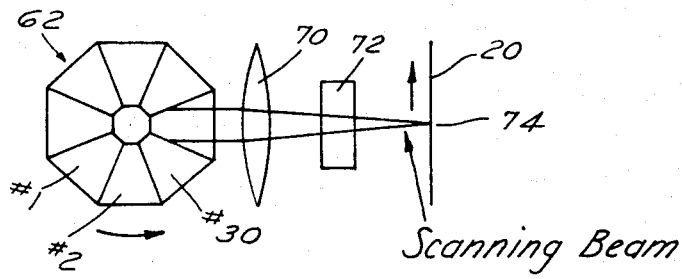

United States Patent
Thomas et al.

[11] 3,758,187
[45] Sept. 11, 1973

[54] METHOD AND APPARATUS FOR RECORDING INTELLIGENCE ON A SHEET MATERIAL

[75] Inventors: Carlton E. Thomas, Van Nuys, Calif.; Norman G. Massey, Ypsilanti, Mich.

[73] Assignee: KMS Industries, Inc., Ann Arbor, Mich.

[22] Filed: June 9, 1971

[21] Appl. No.: 151,458

[52] U.S. Cl. ............ 350/3.5, 350/162 SF, 346/108
[51] Int. Cl. ............................................. G02b 5/18
[58] Field of Search ............ 350/6, 7, 3.5, 162 SF; 178/7.6; 346/108; 179/100.3

[56] References Cited
UNITED STATES PATENTS
3,560,071  2/1971  Silverman et al. .................... 350/3.5

*Primary Examiner*—Ronald L. Wibert
*Attorney*—Barnes, Kisselle, Raisch & Choate

[57] ABSTRACT

A method and apparatus for recording intelligence on a moving sheet such as a light sensitive strip. The data is modulated into a coherent light reference or a signal beam of a holographic recording system while one of the beams is altered in angle for each pass across the recording strip to record a series of holograms, each adjacent series on the strip having a spatial frequency different from the next wherein overlap will not interfere with readout which isolates each frequency in turn.

8 Claims, 10 Drawing Figures

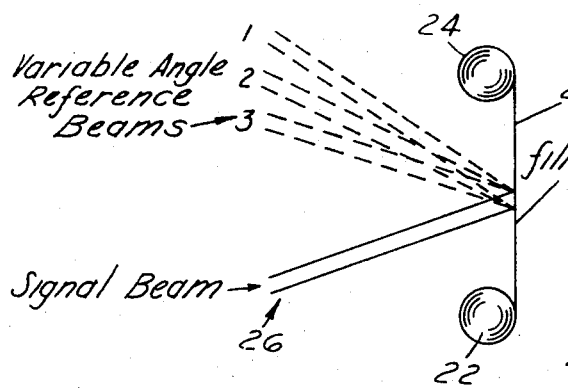
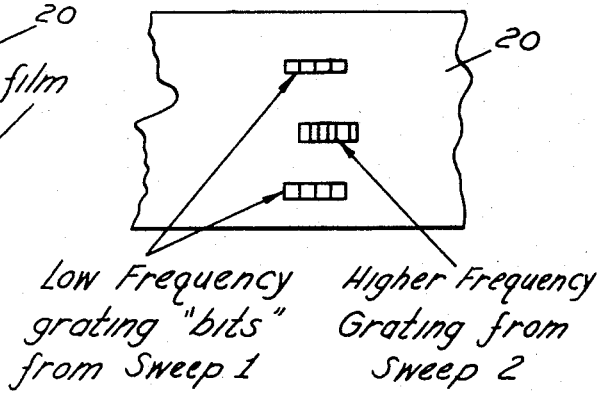
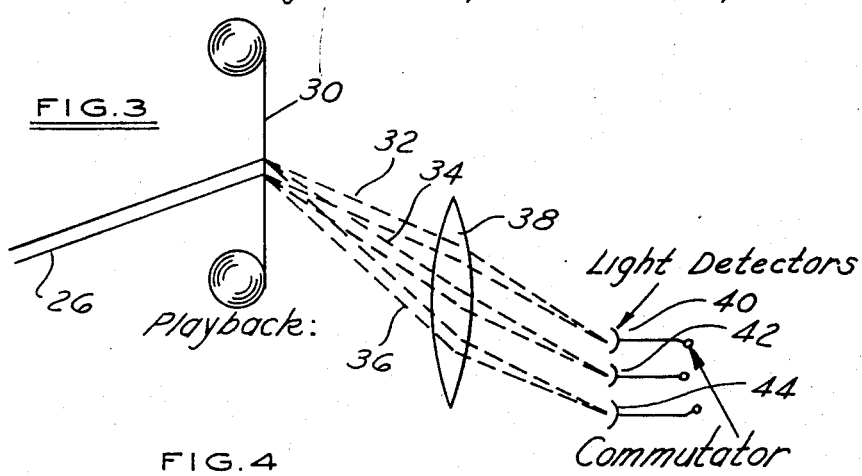
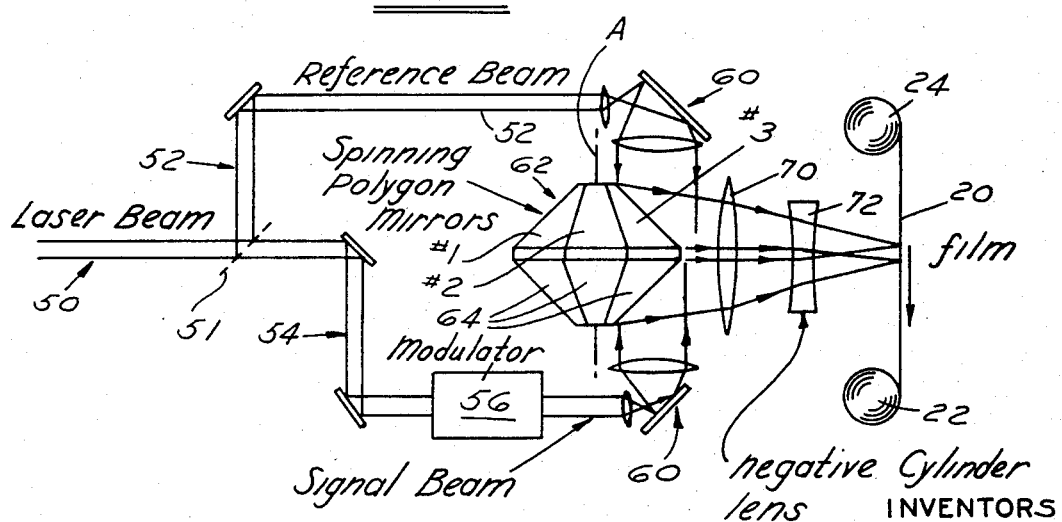
INVENTORS
CARLTON E. THOMAS
NORMAN G. MASSEY
BY
Barnes, Kisselle, Raisch & Choate
ATTORNEYS Scanning Beam

INVENTOR
CARLTON E. THOMAS
NORMAN G. MASSEY
BY

Barnes, Kisselle, Raisch & Choate
ATTORNEYS

METHOD AND APPARATUS FOR RECORDING INTELLIGENCE ON A SHEET MATERIAL

This invention relates to a Method and Apparatus for Recording Intelligence on a Sheet Material such as a film in such a manner that the intelligence can be subject to readout at will.

It is an object of the present invention to improve on present type recorders by permitting higher bandwidths to be recorded with much lower mechanical tolerances and a much better signal-to-noise ratio.

It is an object of the invention to record and permit playback of very wide bandwidth, analog, or digital data on photosensitive film.

In this history of this art of recording, it has become known that a laser may be used to record information. The highly collimated laser beam can be focused to a small intense spot of light on film and this brightness in turn can be utilized to record on very high resolution, low sensitivity films, thereby achieving very high packing densities.

It is also possible to record very wide bandwidth signals which require short dwell times on each film resolution element. There have been difficulties, however, encountered in playback where film noise and tracking difficulties limit the performance. Devices are available for bandwidths up to 100 megahertz (MHz). The basic components of a conventional laser recorder have included a flat film with a laser beam which is swept across the film by a rotating polygon mirror with a light moudlator interposed in a beam to add the intelligence which is to be recorded. There have been, however, limitations on these conventional recording systems. The bandwidth is limited by the rotation rate of the polygon mirror.

Other problems with the conventional laser recorders are noise and the readout tracking system. At low data rates, the fine lines on film can be tracked by a mechanical servo system driving a mirror. At megacycle rates, mechanical tracking has been difficult. Without a tracking loop, the mechanical tolerances on recording and playback are extremely tight. First of all, the polygon mirror faces must be accurate to seconds of arc or less to keep the tracks accurately spaced. Even the bearings supporting the mirror must have micro inches of runout and the film drive must be extremely uniform on playback as well as during recording.

In view of the above difficulties, it is an object of the present invention to provide an improved recording and playback method and system which will handle wide bandwidth, analog, or digital data to the extent of 400 MHz with much lower mechanical tolerances on the equipment used and a much better signal-to-noise ratio. Basically, this involves the concept of recording narrow gratings, that is, one dimensional holograms with infinite focal lengths, on the film instead of focused spots.

The concept further includes the changing of the spatial frequencies of these gratings for each scan line in sequence. Thus, due to the nature of the holographic information, the adjacent scan lines can overlap on the film without producing intolerable channel cross talk. However, due to the different grating frequencies, the different channels can be separated for readout. This virtually eliminates the tracking problem of previous devices inasmuch as a Fourier transformation is spatially invariant, and the location of the reconstructed light spots in readout is independent of the horizontal location of the gratings on the film. Thus, the system compensates for lateral displacement of the gratings during recording due to possible polygon mirror angular error or for erratic film motion.

A distinct advantage of the proposed system is that there is a considerable reduction in noise. Dust or scratches the size of a resolution spot will not destroy any particular bit of information.

It is thus an object of the invention to provide a superior recording and readout system which permits the use of less expensive equipment without detracting from the quality of the output.

Other objects and features of the invention will be apparent in the following description and claims in which the principles of operation are set forth together with the best mode presently contemplated for the practice of the invention.

Drawings accompany the disclosure and the various views thereof may be briefly described as:

FIG. 1, an illustration of the variable angle presentation to a recording medium.

FIG. 2, an illustration of the location of the information on a recording sheet.

FIG. 3, an illustration of a playback system.

FIG. 4, a diagrammatic presentation of a recording system.

FIG. 5, a top view of the scanning beam.

Figure 6:
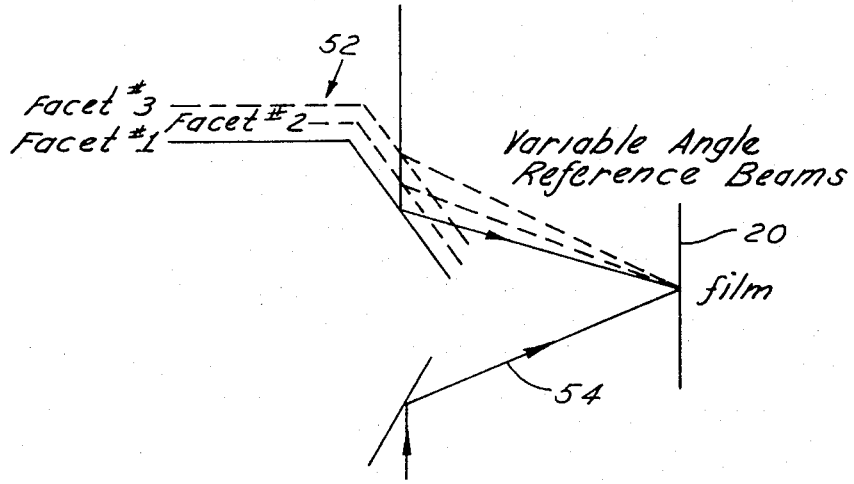

FIG. 6, a detail diagrammatic presentation showing the various angle positions of a reference beam.

Figure 7:
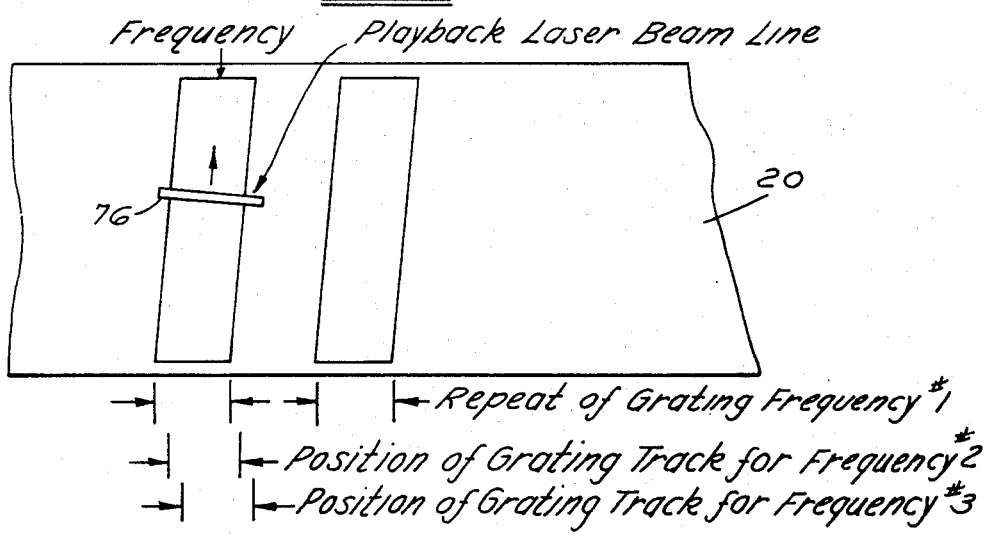

FIG. 7, a view of the recording medium relative to the playback laser beam.

Figure 8:
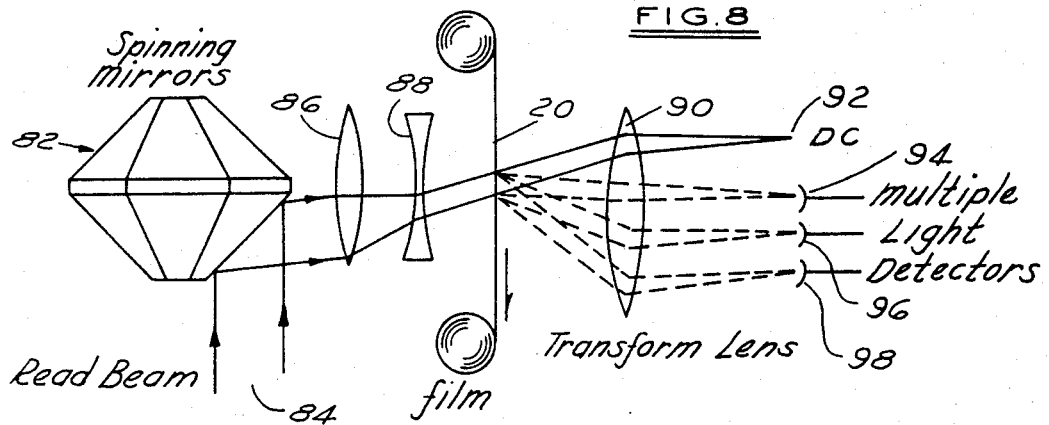

FIG. 8, a readout system using multiple light detectors.

Figure 9:
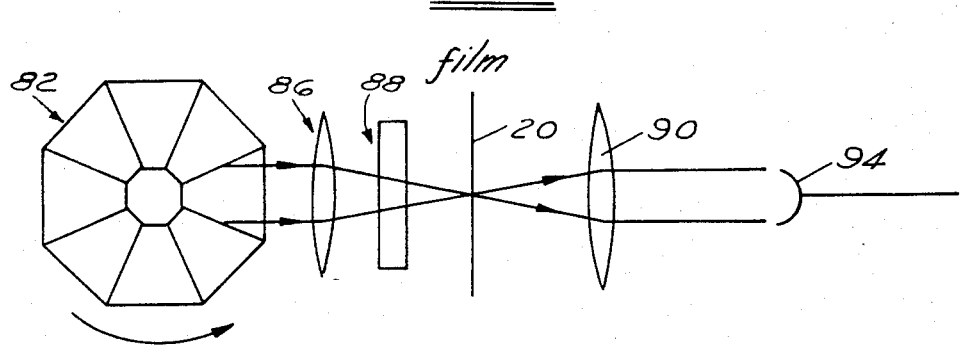

FIG. 9, a top view of the system shown in FIG. 8.

Figure 10:
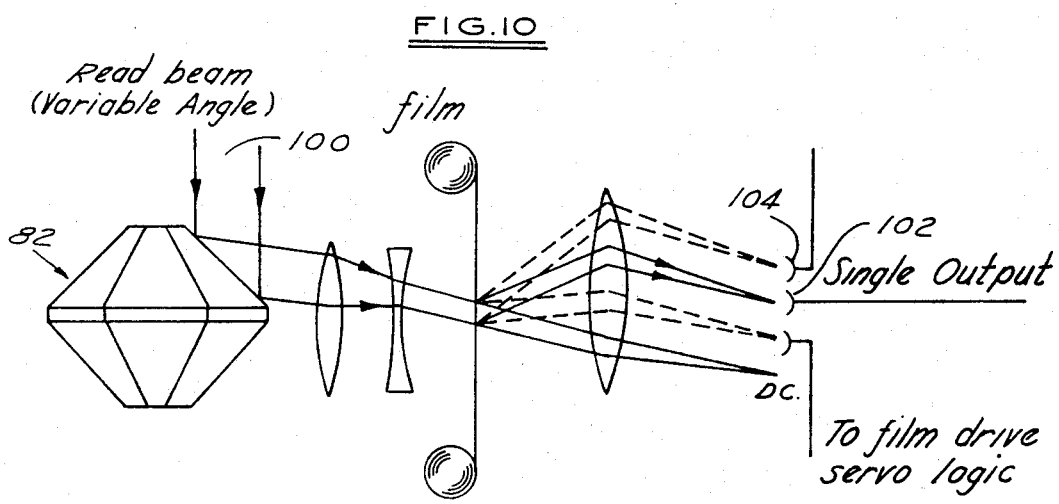

FIG. 10, a variable beam readout system utilizing a single output.

REFERRING TO THE DRAWINGS

In FIG. 1 is shown a recording sheet 20 movable as a strip on feed-out and reel-in rollers 22 and 24 respectively. A holographic record is generated by utilizing an illuminating beam and a reference beam referenced in the drawing as a signal beam 26 and various reference beams 1, 2 and 3.

The basic concept of the invention is to record narrow gratings, that is, holographic records, in one dimension with infinite focal lengths on the film 20. For each scan line across the film at an angle to the direction of movement thereof, there is a different angle of the reference beam. This is accomplished by an apparatus to be described later. Adjacent lines are allowed to overlap on the film as illustrated in FIG. 2 where low frequency grating bits from a sweep 1, for example, are shown extending across the strip 20 at one location and the higher frequency grating from sweep 2 is shown at a slightly displaced location but still overlapping portions from the information from sweep 1. Because of the nature of the holographic information and the different spatial frequency, this overlapping does not produce channel cross-talk.

In the playback shown in FIG. 3, the signal beam or illuminating beam 26 can be provided on the developed film 30 and because of the varying spatial frequencies, the output from the various sweeps will assume different angles 32, 34, and 36, each passing through a lens 38 and each discriminated beam on the right side of the lens reaching photodetectors 40, 42 and 44. A suitable commutator sequentially samples these photodetectors, thereby reconstructing the signal. It will be appreciated that what is being recorded here is a time-varying electrical signal as distinguished from a two or three-dimensional light pattern.

A diagrammatic presentation of an apparatus for achieving the holographic recording is illustrated in FIGS. 4 and 5. In the side view in FIG. 4, the laser beam 50 is split by a suitable transmission reflector plate 51 into a reference beam 52 and a signal beam 54. A modulator 56 lies in the signal beam to add the desired intelligence or data that is to be recorded. The modulator 56 can use a transverse field, such as KD*P. The signal beam will be turned on for each digital pulse or will be continuously modulated for an analog signal. The two beams are carried through suitable lens and reflector assemblies 60 and reach opposite sides of a spinning polygon mirror assembly 62 having multiple facets arranged in symmetricl relationship on opposite sides around a spinning axis A. This reference beam polygon 62 has a special construction on the top half in that the respective facets of the mirrors No. 1, No. 2, and No. 3, and so forth, around the assembly, are displaced from the axis of rotation at different angles. Accordingly, as the assembly 62 rotates, each top facet intercepts and reflects the reference beam 52 at a different axial position. The bottom facets 64 of the assembly 62 are all disposed at the same angle to the axis A of rotation.

The angles of the facets are adjusted to direct the reference beam toward the signal beam on the recording film 20. The net result is to produce a different reference beam angle and, in consequence, a different grating frequency, for each pair of mirror facets. Both the reference beam and the signal beam leave the spinning polygon assembly 62 and pass through a lens 70 and a lens 72 to focus at 74 on the moving recording sheet 20. The use of the cylindrical lens 72 focuses the laser beams to narrow horizontal lines on the light sensitive film. The vertical resolution of these lines determines the along-track packing density.

When a bit of data is present, the system records a narrow horizontal grating on the film. When there is no signal, the reference beam 52 uniformly exposes the film. This uniform exposure is necessary to bias the film properly for all combinations of possible signal gratings which might be overlapped on any horizontal line. Once the polygon mirrors go through one revolution, the grating frequency sequence repeats itself. The film speed, that is, the movement of the film 20 along its length, is adjusted so that a given grating frequency band is separated on the film as shown in FIG. 7.

In FIG. 6, the respective reference beams 52 from facets 1, 2 and 3, for example, of the top of the polygon assembly 62 will reach the film 20 as shown while the signal beam or illuminating beam 54 reaches it from the bottom polygon facets in a different direction. The spacing of the recording area from the various facets is described in connection with FIG. 2.

As further illustrated in FIG. 7, the respective positions of the resulting grating frequencies 1, 2, and 3 are shown and the repeat of the grating frequency is illustrated. During playback, the laser read beam which must be used to illuminate the recorded holographic gratings has a width which is slightly wider than a grating track but not significantly larger than a grating track separation. See, for example, the playback laser beam 76 as it reaches the film on FIG. 7. Due to the overlapping nature of the multiple frequency grating tracks, the laser read beam will be centered approximately on some track no matter what the relationship is between the film position and the spinning mirror angle. Adjacent grating tracks will also be illuminated but with a lower percentage of light than the particular track centered on the laser beam.

One possible playback system is shown diagrammatically in FIG. 8. This is basically a flying line scanner which utilizes a polygon rotating mirror assembly 82 which scans a horizontal line of light across the film 20. A read beam 84 reaches the lower side of the spinning polygon mirror assembly 82 and passes through convex lens 86 and cylindrical lens 88 to the film 20. The transform lens 90 focuses the DC light, that is, the undiffracted light, at 92, and the light which is diffracted by the respective signal gratings is directed to separate spots at the back of the focal plane where there will be located multiple light detectors 94, 96 and 98 and so forth, one for each grating frequency. The horizontal location of these spots is independent of the film position.

In the side view shown in FIG. 9, it will be seen that the transform lens 90 collimates the focused line of light so that it reaches the light detectors. Since the polygon mirror center of rotation coincides with the front focal point of the cylindrical lens 88, the central light ray passing through the film is always horizontal as it scans across the film. The transform lens, therefore, focuses these parallel rays on axis and the net result is that a single stationary bank of detectors can reproduce the entire signal wave train.

To reconstruct the signal, the outputs from the photodetectors must be commutated as described in connection with FIG. 3. Each detector is sampled for one sweep and at the end of the sweep the adjacent detector is coupled to the output of the recorder. The choice of which detector to sample is made by integrating the total energy in each channel. On the average, the grating track most centrally located will produce the most detected energy. Suitable logic circuits instruct the commutator to sample the frequency with the maximum average current. The commutated switching time is controlled by a synchronous pulse which is derived from the scanning laser beam and picked up at 96 for example. Just before each laser beam illuminates the first bit of data, it passes over a slit and the photodetector system which in turn generates the synchronization pulse. This same synchronization pulse is used to control the film drive servo system or playback. On the average the film advances one data track width for each pulse.

An alternate playback system, which eliminates the need for a commutator, is shown in FIG. 10. Instead of scanning the film via the signal beam polygon, wherein all the angles are equal, in this case the upper portion of the spinning polygon assembly 82 is used wherein the mirrors are disposed at different angles as described in connection with FIG. 4. Each scan has a different angular direction as during the recording when the light beam 100 from a laser source approaches the spinning assembly 82 from the top.

Accordingly, each scan has a different angular direction as it had during the recording, and when the film and the scanning mirror are in proper relationship, the complete signal will appear on a single output detector 102. This detector is aligned such that it would detect the signal beam if it were on, thus illuminating the holographic recording on the film with a reference beam reconstructing the signal beam. Then it is necessary to synchronize the film horizontal position to the reference beam mirror and otherwise the readout is the same as previously described. When the film is properly aligned relative to the polygon mirror angle, the output detector will generate the maximum average signal powers. The other frequencies may be monitored for gross tracking purposes only at 104, for example. As one of these auxiliary detectors begins to generate more average energy than the output detector, the film drive velocity is altered appropriately.

We claim

1. A method of recording and retrieving data which comprises:
   a. directing an illuminating beam and a reference beam from a coherent light source toward a light sensitive medium,
   b. interposing a light modulator responsive to informational data in one of said beams,
   c. moving said beams and said medium relative to each other to sweep the beams across the medium in one direction while moving the medium in a direction transverse to the direction of the sweep,
   d. shifting one of said beams to a different angle relative to the plane of said medium after each sweep to record during each sweep a one-dimensional holographic record of a different spatial frequency, related to said different angle, to that recorded during any adjacent sweep,
   e. illuminating the recorded data on said medium progressively with a beam from a coherent light source to produce a discrete output light signal for each spatial frequency sweep on said medium, and
   f. directing the discrete output signals of said illumination to a light responsive detector to recreate the informational data introduced by the modulator.

2. A method as defined in claim 1 in which the illumination of the recorded data is accomplished by directing the beam of coherent light to the medium at angles successively substantially the same as the angles of exposure of said one of said beams.

3. A method as defined in claim 1 which includes directing the discrete output light signals from each spatial frequency to one of a plurality of light responsive detectors, and commutating the respective signals emanating from the detectors.

4. A method for readout of recorded data on a continuous strip, said data being recorded as closely adjacent overlapping holographic records each with a different spatial frequency, which comprises illuminating said strip in successive sweeps of a coherent light beam establishing relative movement between the strip and the beam sweep in a direction transverse to the direction of beam sweep, and sequentially varying the angle of said beam for each spatial frequency to produce output beams at discrete angles from said strip, and sequentially detecting the intensity of said output beams to reproduce recorded data.

5. A method of recording data on a light sensitive recording medium which comprises:
   a. directing an illuminating beam and a reference beam from a coherent light source toward a light sensitive medium,
   b. interposing a light modulator responsive to informational data in one of said beams,
   c. moving said beams and said medium relative to each other to cause the beams to sweep across the medium in one direction while the medium moves in another direction, and
   d. shifting one of said beams to a different angle relative to said medium after the completion of each sweep to record during each sweep a one-dimensional holographic record of a different spatial frequency related to said different angle recorded during any adjacent sweep.

6. A system for recording data on a light sensitive recording medium which comprises:
   a. a sheet of light sensitive recording medium,
   b. means for moving said sheet in one direction,
   c. a source of coherent light,
   d. means for directing an illuminating beam and a reference beam from said source to said sheet at respectively different angles to the plane of said sheet,
   e. means to cause said beams to sweep said sheet in a direction angled to said one direction as said sheet moves in said one direction,
   f. means interposed in one of said beams to modulate said one of said beams in response to informational data, and
   g. means to alter the angle of one of said beams relative to said sheet upon completion of a sweep across said sheet to create for successive sweeps closely adjacent one-dimensional holographic records each having a discernibly different spatial frequency to that of an adjacent record.

7. A system as defined in claim 6 in which said means to cause said beams to sweep said sheet and to alter the angle of one of said beams comprises a body having two hemispheres mounted for rotation on an axis, each hemisphere of said body, above and below a bisecting plane perpendicular to said axis, having disposed thereon a plurality of discrete reflective surfaces, the discrete surfaces on one hemisphere being disposed to intersect the axis of rotation at equal angles for reflecting one of said beams, and the discrete surfaces on the other of said hemispheres being disposed to intersect said axis at varying angles for reflecting the other of said beams.

8. A system for readout of recorded data on a continuous strip, said data being recorded as closely adjacent overlapping one-dimensional holographic records each with a different spatial frequency which comprises a light source for producing a coherent light beam, scanning means for intercepting and directing said beam to said strip at varying angles comprising a body having a plurality of discrete reflective surfaces mounted at varying angles to the axis of rotation of said body, means for rotating said body to scan said beam transversely of said strip, means for moving said strip in the path of said beam as reflected by said surfaces wherein each holographic record is sequentially displayed as a light output, and means for recording said light output to recreate the recorded data.

* * * * *